May 2, 1939.  T. L. TITUS  2,156,518
LIQUID DISPENSING VALVE
Filed May 28, 1938    2 Sheets-Sheet 1

Inventor:
Thomas L. Titus
By Whitehead & Vogl
per Carle Whitehead
Attorneys

May 2, 1939.   T. L. TITUS   2,156,518
LIQUID DISPENSING VALVE
Filed May 28, 1938   2 Sheets-Sheet 2

Inventor:
Thomas L. Titus
By Whitehead & Vogl
Per Earle Whitehead
Attorneys

Patented May 2, 1939

2,156,518

UNITED STATES PATENT OFFICE 2,156,518

LIQUID DISPENSING VALVE

Thomas L. Titus, Denver, Colo., assignor to The Wyott Manufacturing Company, Cheyenne, Wyo., a corporation of Wyoming Application May 28, 1938, Serial No. 210,551

8 Claims. (Cl. 225—27)

This invention relates to liquid dispensing valves.

Specifically the invention is an improvement in valve mechanisms used in controlling the flow of liquids from a reservoir, usually into smaller receptacles as, for example, the flow of coffee from an urn into a cup, and the invention is illustrated and described in the terms of such example or embodiment, it being understood that it is capable of use in a large variety of structures and for a large variety of liquids.

Objects of the invention are to provide a valve mechanism of the class described, which shall be positive in operation, which eliminates all necessity for packing operative parts, which can be readily disassembled and cleaned, which requires no adjustment but, on being assembled, automatically falls into and remains in proper adjustment, which has no threads or equivalents in or connected with the operating mechanism and which is simple, economical and substantial, and reduces to a minimum the wearing of parts and accomplishes these objects, while keeping the handles or other valve-operating means conveniently adjacent to the point at which the receiving receptacle is positioned during the filling thereof.

With these and other objects in view, all of which will hereinafter more fully appear, the invention comprises certain novel constructions, combinations and arrangements of parts which will be hereinafter described and claimed and of which an illustrative embodiment is shown in the accompanying drawings, in which Fig. 1 is a vertical section of a fragment of a reservoir having attached thereto a valve mechanism constructed according to this invention.

Figure 1:
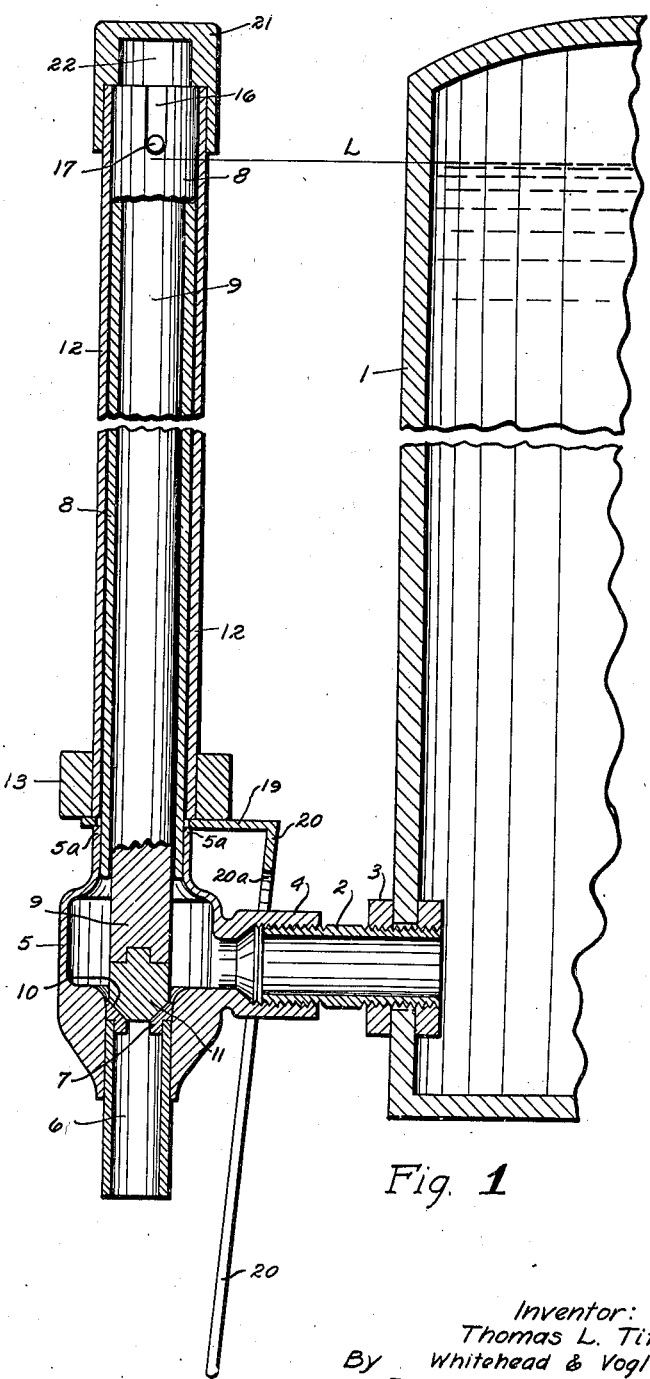

A coffee urn is indicated at 1. The valve mechanism is in open communication with the bottom of the urn through any suitable means as pipe 2 which may also serve as a support for the valve mechanism, the pipe 2 being mounted in the wall of the urn by suitable means as by being threaded into the collar 3 at one end and into threaded hollow lug 4 of the valve housing at the other end.

The valve mechanism comprises a housing 5 in open communication with the urn 1 through pipe 2, having an outlet or down spout 6 surmounted by a valve seat 7, and a standpipe 8 rising to or above the high lever L of the liquid in urn 1. Freely slidable within the standpipe 8 is a valve shaft 9 terminating at its lower end in a plug 10, said lower end, including said plug, being preferably formed of a suitable material, such as chromium steel, constituting a tip 11, the balance of shaft 9 being of cheaper material.

Slidably enclosing the standpipe 8 is a sleeve 12 having a collar 13 upon its lower end and a recess 14 including a cam 15 at its upper end.

The standpipe 8 is provided with a slot 16 and the shaft 9 carries a pin 17 adapted to project through the slot 16 and into the recess 14 near the lower end of cam 15 when the plug 10 is on seat 7. The bottom of slot 16 must be above the high liquid level in the reservoir so that no liquid can overflow the standpipe 8.

The valve may be opened by either of two devices, both being illustrated because in practice, both are incorporated in the completed structure.

Figure 2:
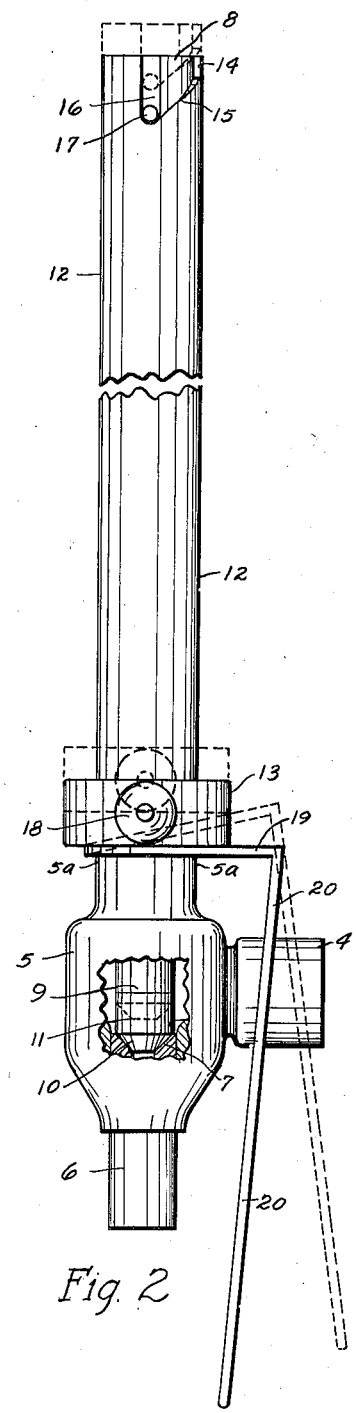
Fig. 2 is an elevation of said mechanism, a portion of the wall being broken away to disclose the valve and seat, the movement of certain parts being indicated in broken lines.
Figure 3:
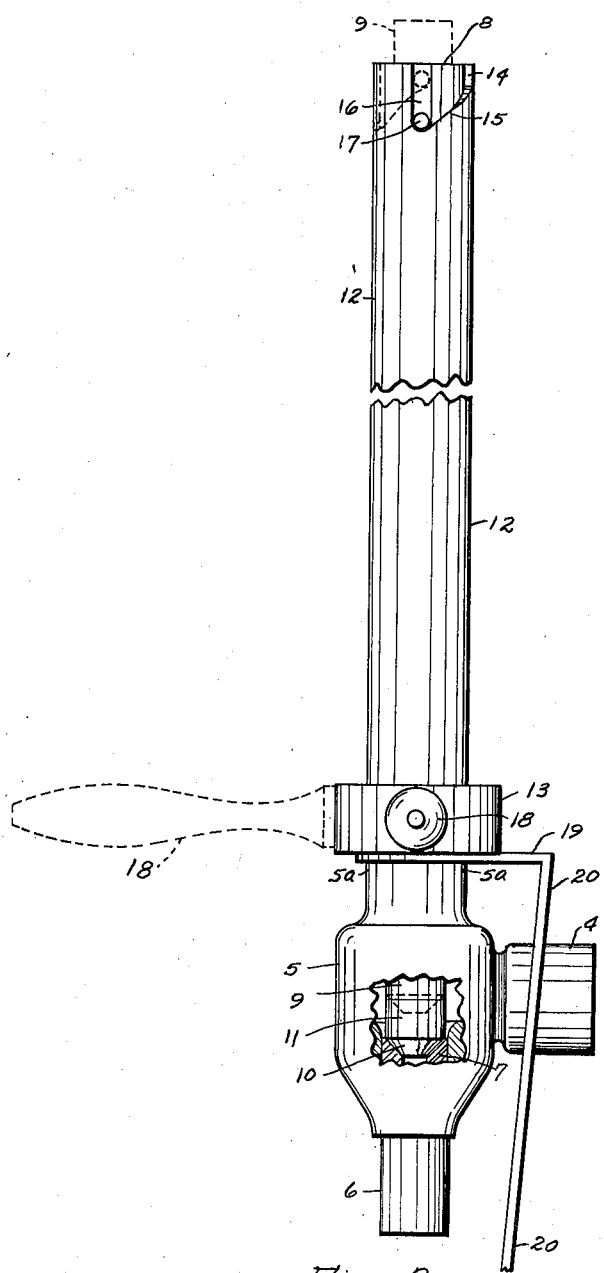
Fig. 3 is a view similar to Fig. 2 but illustrating the opening of the valve by a different mechanism than that used for the operation indicated in Fig. 2.

The collar 13 carries a handle 18 normally in position shown in full lines in Figs. 2 and 3. When handle 18 is turned to position shown in broken lines at Fig. 3 sleeve 12 is rotated and cam 15 moves to the broken line position in Fig. 3 and in so doing, forces pin 17 upward and thereby lifts shaft 9, thus raising plug 10 from seat 7, as indicated in broken lines at the bottom of Fig. 3, and allowing liquid to flow from the urn through pipe 2 and out through outlet 6. When the desired quantity of liquid has thus been released handle 18 is returned to normal position thus releasing pin 17, whereupon shaft 9 drops and seats plug 10 on seat 7, stopping the flow. It will be understood that the inclination of cam 15 and the weight of shaft 9 may, if desired, be so proportioned that when handle 18 is released, the downward pressure of pin 17 on cam 15 will rotate sleeve 12 and by gravity, return the parts to normal position. The manual operation of handle 18 in both directions will, in most cases, however, be found the more desirable.

The other means for opening the valve comprises an angled lever, one arm, 19, of which loosely encircles standpipe 8 and rests upon the upper end 5a of housing 5, the lower end of sleeve 12 and the collar 13 normally resting on the top of arm 19. The other arm 20 of the lever is bifurcated, as indicated at 20a, and straddles lug 4 and projects downwardly adjacent and below outlet 6 so that a receptacle, such as a cup to be filled with liquid from the urn, may be positioned beneath the outlet 6 and, while still therebeneath, moved against bifurcated arm 20, forcing it back to broken line position in Fig. 2, thus causing arm 19 to raise collar 13 and, with it, sleeve 12, carrying upwardly pin 17 and shaft 9 and opening the valve, all as clearly indicated in broken lines at Fig. 2. When the receptacle has received the desired liquid it is removed from contact with arm 20 whereupon the parts will drop by gravity into normal positon, closing the valve.

The top of the device may be covered by a cap 21 seated on the top of sleeve 12 and provided with a recess 22 to permit the projection thereinto of the upper end of shaft 9.

While I have illustrated and described many details of construction I desire not to be confined to such details because many variations and modifications and equivalents thereof will be obvious to those skilled in the art, within the spirit and scope of this invention, the foregoing specification and the appended claims.

I claim:

1. A device for dispensing liquid from a reservoir, comprising a housing having a conduit leading thereinto from the reservoir and extending upwardly above the liquid level in the reservoir and having an outlet below the conduit, a valve seat in the housing above the outlet, a plug for said seat and a shaft carrying said plug and reciprocable in the upper part of said housing and operating means slidably mounted on the housing engaging said shaft above said liquid level but carrying actuating means adjacent the outlet, for reciprocating said shaft.

2. In a device for dispensing liquid from a reservoir, a housing adapted to receive liquid from the reservoir and including a valve seat with an outlet therebelow and a casing extending upwardly to and above the high liquid level in the reservoir, a shaft reciprocable in the casing and having a valve plug on its lower end, operating means slidable on the outside of the casing and having engagement with said shaft above said liquid level and actuating means in proximity to said outlet for sliding said operating means to reciprocate said shaft.

3. In a device for dispensing liquid from a reservoir, a housing adapted to receive liquid from the reservoir and including a valve seat with an outlet therebelow and a casing extending upwardly to and above the high liquid level in the reservoir, a shaft reciprocable in the casing and having a valve plug on its lower end and operating means rotatable on the casing and having a pin and cam engagement with said shaft above said liquid level whereby the rotation of said operating means reciprocates said shaft.

4. In a structure as defined in claim 3, a handle carried by said operating means in close proximity to said outlet for rotating said operating means.

5. In a device for dispensing liquid from a reservoir, a housing adapted to receive liquid from the reservoir and including a valve seat with an outlet therebelow and a casing extending upwardly to and above the high liquid level in the reservoir, a shaft reciprocable in the casing and having a valve plug on its lower end, operating means reciprocably mounted on the outside of said casing and means interengaging said operating means and said shaft above said liquid level whereby the reciprocation of said operating means will reciprocate said shaft.

6. In a structure as defined in claim 5, lever means adjacent said outlet for reciprocating said operating means.

7. In a device for dispensing liquid from a reservoir, a housing having an intake for liquid from the reservoir and extending above the liquid level in the reservoir and having an outlet below the intake, a valve within the housing, valve operating means without the housing and means above said liquid level operatively interengaging said operating means and said valve.

8. In a structure as defined in claim 7, means positioned in close proximity to said outlet for actuating said operating means.

THOMAS L. TITUS.